(12) United States Patent
Zhu et al.

(10) Patent No.: US 12,449,292 B2
(45) Date of Patent: Oct. 21, 2025

(54) CORIOLIS MASS FLOW METER AND METHOD FOR DETERMINING VARIABLES INFLUENCING THE TOTAL ZERO POINT ERROR OF THE METER, METHOD FOR DETERMINING THE TOTAL ZERO POINT ERROR AND OPERATING METHOD FOR SAME

(71) Applicant: Endress+Hauser Flowtec AG, Reinach (CH)

(72) Inventors: Hao Zhu, Freising (DE); Ennio Bitto, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 219 days.

(21) Appl. No.: 18/258,921

(22) PCT Filed: Nov. 26, 2021

(86) PCT No.: PCT/EP2021/083169
§ 371 (c)(1),
(2) Date: Jun. 22, 2023

(87) PCT Pub. No.: WO2022/135830
PCT Pub. Date: Jun. 30, 2022

(65) Prior Publication Data
US 2024/0044686 A1  Feb. 8, 2024

(30) Foreign Application Priority Data
Dec. 22, 2020  (DE) .................... 10 2020 134 707.3

(51) Int. Cl.
*G01F 1/84*  (2006.01)
*G01F 25/10*  (2022.01)

(52) U.S. Cl.
CPC .......... *G01F 1/8436* (2013.01); *G01F 1/8422* (2013.01)

(58) Field of Classification Search
CPC ....... G01F 1/8436; G01F 1/8422; G01F 25/10
(Continued)

(56) References Cited

U.S. PATENT DOCUMENTS

| 5,796,012 A | 8/1998 | Gomi et al. |
| 2005/0119845 A1 | 6/2005 | Lesjak |

(Continued)

FOREIGN PATENT DOCUMENTS

| CN | 11263881 A | 6/2020 |
| CN | 111279162 A | 6/2020 |

(Continued)

*Primary Examiner* — Laura Martin
*Assistant Examiner* — Anthony W Megna Fuentes
(74) *Attorney, Agent, or Firm* — Kelly J. Smith; Endress+Hauser (USA) Holding, Inc.

(57) ABSTRACT

A method for determining variables influencing a total zero point error of a Coriolis mass flow meter comprises: exciting a vibration of a bending vibration mode; measuring a first total zero point error T at a flow of zero; ascertaining a first damping value D of the vibration of the bending vibration mode; measuring an exciter-independent zero point error I during a decaying vibration of the bending vibration mode at a flow of zero; ascertaining a first exciter-dependent contribution E to the first total zero point error T based on the first total zero point error T and based on the exciter-independent zero point error I; and ascertaining a sensitivity factor S for the bending vibration mode based on the first exciter-dependent contribution E to the total zero point error T and based on the first damping value D.

12 Claims, 3 Drawing Sheets

(58) Field of Classification Search
USPC .............................................. 73/1.16, 861.356
See application file for complete search history.

(56) References Cited

U.S. PATENT DOCUMENTS

| | | | |
|---|---|---|---|
| 2008/0011100 A1 | 1/2008 | Sharp et al. | |
| 2010/0095784 A1* | 4/2010 | Kuttler ..................... | G01F 1/74 |
| | | | 73/861.356 |
| 2011/0154915 A1* | 6/2011 | Chiken ................. | G01F 1/8436 |
| | | | 73/861.356 |
| 2020/0278231 A1 | 9/2020 | Zhu | |

FOREIGN PATENT DOCUMENTS

| | | |
|---|---|---|
| DE | 102017125273 A1 | 5/2019 |
| EP | 2019295 A1 | 1/2009 |
| WO | 9831990 | 7/1998 |
| WO | 9831990 A1 | 7/1998 |

* cited by examiner

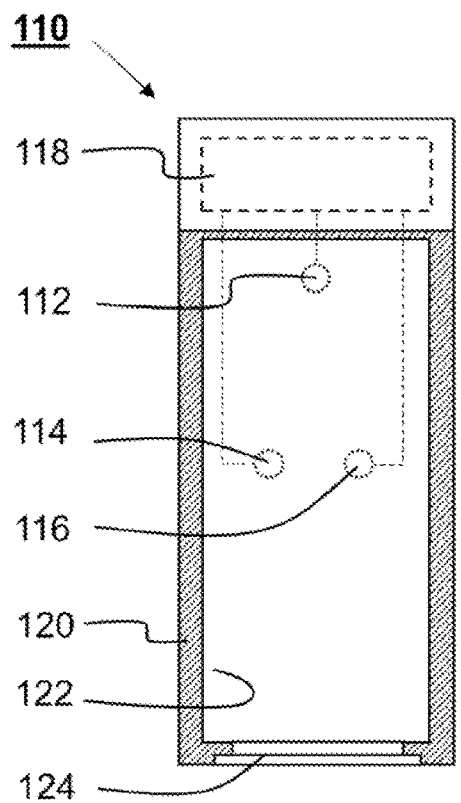
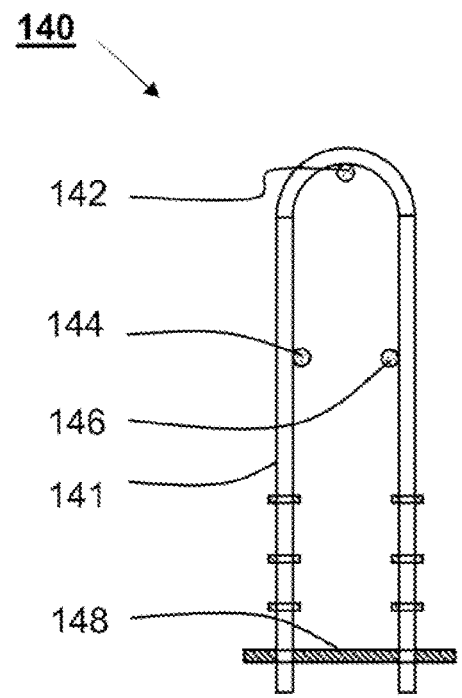
Fig. 1a
Fig. 1b
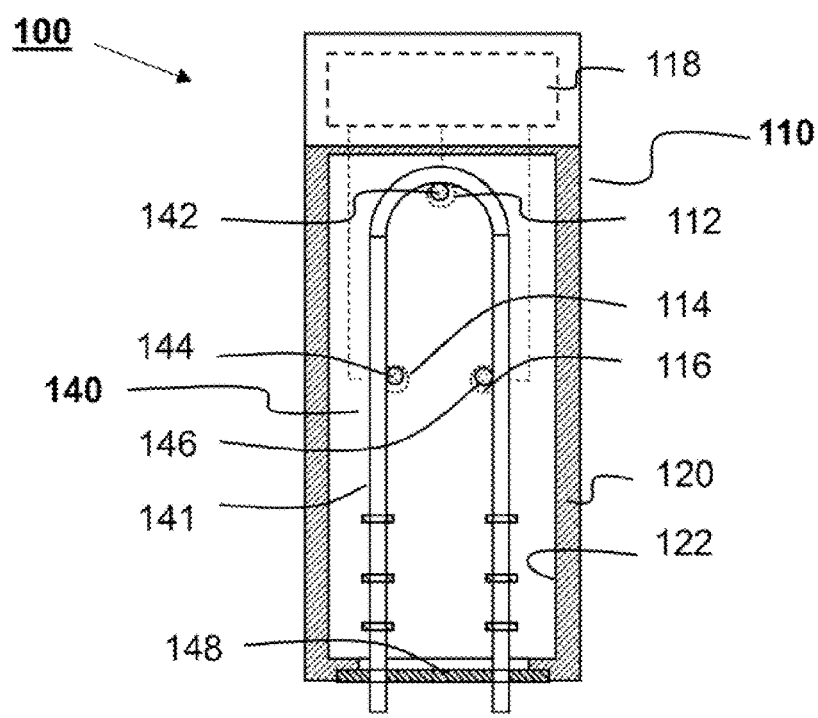
Fig. 1c

CORIOLIS MASS FLOW METER AND METHOD FOR DETERMINING VARIABLES INFLUENCING THE TOTAL ZERO POINT ERROR OF THE METER, METHOD FOR DETERMINING THE TOTAL ZERO POINT ERROR AND OPERATING METHOD FOR SAME

CROSS-REFERENCE TO RELATED APPLICATIONS

The present application is related to and claims the priority benefit of DPMA Patent Application No. 10 2020 134 707.3, filed on Dec. 22, 2020 and International Patent Application No. PCT/EP2021/083169, filed on Nov. 26, 2021, the entire contents of which are incorporated herein by reference.

TECHNICAL FIELD

The present invention relates to a Coriolis mass flow meter and a method for determining variables influencing the total zero point error of the meter, a method for ascertaining the total zero point error, and an operating method for same.

BACKGROUND

Measuring tubes of Coriolis mass flow meters experience excitation of a bending vibration mode by means of an exciter, wherein the excitation ideally takes place in the symmetry of the bending vibration mode, wherein a mass flow through the measuring tubes causes a superimposition of the next higher antisymmetric bending vibration mode. This causes a phase shift between inlet-side and outlet-side portions of the vibrating measuring tubes, the measurement of which enables the determination of the mass flow. In real measuring tubes, the excitation can differ from the symmetry of the vibration mode due to manufacturing tolerances so that as a result of the excitation, a proportional excitation of the next higher antisymmetric vibration mode also takes place, which causes an exciter-dependent zero point error in the flow measurement. Furthermore, asymmetries due to manufacturing tolerances can also occur with components other than the exciter. These asymmetries cause an exciter-independent zero point error. The total zero point error results as the sum of the two aforementioned error contributions, wherein a dependence on a damping of the bending vibration mode can also be established.

SUMMARY

It is therefore the object of the present disclosure to provide methods that enable precise determination of the zero point error and to provide a Coriolis mass flow meter capable thereof.

The object is achieved by the methods and by the Coriolis mass flow meter according to the present disclosure.

The first method according to the invention serves to determine variables influencing a zero point error of a Coriolis mass flow meter comprising: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the method comprises: exciting a vibration of a bending vibration mode of the measuring tube; ascertaining a total zero point error with a first medium in the measuring tube at a flow of zero; ascertaining a damping value of the vibration of the bending vibration mode with a first medium in the measuring tube; ascertaining an exciter-independent zero point error in a decaying vibration of the bending vibration mode with the first medium in the measuring tube at a flow of zero; ascertaining an exciter-dependent contribution to the total zero point error based on the total zero point error and based on the exciter-independent zero point error; and ascertaining a sensitivity factor for the bending vibration mode based on the exciter-dependent contribution to the total zero point error and based on the damping value.

The sensitivity factor is substantially dependent on the degree of symmetry breaking by the exciter, especially, due to manufacturing tolerances. If the position of the exciter with respect to the measuring tube is fixed, the sensitivity factor practically cannot change. A sensitivity value once ascertained can therefore be stored and used for the determination of the exciter-dependent zero point error as long as the symmetry deviation between the measuring tube and the exciter is unchanged. This can be assumed for the entire service life of the device in the case of the intended use of Coriolis mass flow meters in which the measuring tubes are non-detachably connected to the exciters.

In a development of the invention, ascertaining the damping value comprises forming a quotient of an excitation current for exciting the vibration and the vibration amplitude achieved therewith.

In a development of the invention, ascertaining the damping value comprises ascertaining a time constant of the decaying vibration of the bending vibration mode.

In a development of the invention, ascertaining an exciter-dependent contribution to the total zero point error comprises forming a difference between the total zero point error and the exciter-independent zero point error.

In a development of the invention, ascertaining the sensitivity factor comprises dividing the exciter-dependent contribution to the total zero point error by the damping value.

In a development of the invention, the method furthermore comprises ascertaining an updated exciter-independent zero point error, comprising: exciting a vibration of a bending vibration mode with a second medium in the measuring tube; measuring a second total zero point error with the second medium in the measuring tube at a flow of zero; ascertaining a second damping value with the second medium in the measuring tube; and ascertaining the updated exciter-independent zero point error on the basis of the second total zero point error, the second damping value and the sensitivity factor.

According to a development of the invention, the determination of a media-dependent third total zero point error of the Coriolis mass flow meter is carried out on the basis of the previously determined influencing variables and comprises: ascertaining a third damping value for a vibration of the bending vibration mode; and calculating the third total zero point error on the basis of the third damping value and the sensitivity factor for the bending vibration mode and the exciter-independent zero point error.

In a development of the invention, the third total zero point error comprises the sum of the exciter-independent zero point error and a third exciter-dependent contribution to the total zero point error.

In a development of the invention, the exciter-dependent contribution to the third total zero point error comprises a product of the sensitivity factor and the third damping value.

The invention also relates to modular Coriolis mass flow meters with replaceable measuring tube assemblies. In these devices, the symmetry deviation between the exciter and the measuring tube can change during each replacement of a measuring tube assembly. After replacing a measuring tube assembly, a new sensitivity factor is therefore preferably determined, as defined in the third method according to the invention.

The second method according to the invention serves to operate a modular Coriolis mass flow meter comprising: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the Coriolis mass flow meter comprises a base module and a replaceable measuring tube module, wherein the measuring tube module comprises the measuring tube and a first component each of the exciter and of the two vibration sensors, wherein the base module comprises the measuring and operating circuit, a housing with a receptacle for the measuring tube module, and a second component each of the exciter and of the two vibration sensors, wherein the method comprises: connecting the measuring tube module to the base module so that the first and second components of the exciter and of the two sensors are in each case in an operative position to one another; and ascertaining a sensitivity factor and an exciter-independent zero point error using the first method according to the invention.

In a development of the invention, the method for operating the modular Coriolis mass flow meter furthermore comprises determining a total zero point error by means of the second method according to the invention.

The Coriolis mass flow meter according to the invention is equipped with: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the measuring and operating circuit is configured to perform at least one of the methods according to the invention.

BRIEF DESCRIPTION OF THE DRAWINGS

The present disclosure is now explained in more detail based on the exemplary embodiments shown in the figures. In the figures:

FIG. 1a shows an exemplary embodiment of a base module of a Coriolis mass flow meter according to the present disclosure;

FIG. 1b shows an exemplary embodiment of a measuring tube assembly of a Coriolis mass flow meter according to the present disclosure;

FIG. 1c shows an exemplary embodiment of a Coriolis mass flow meter according to the present disclosure, with the components of FIGS. 1a and 1b;

DETAILED DESCRIPTION

Figure 2A:
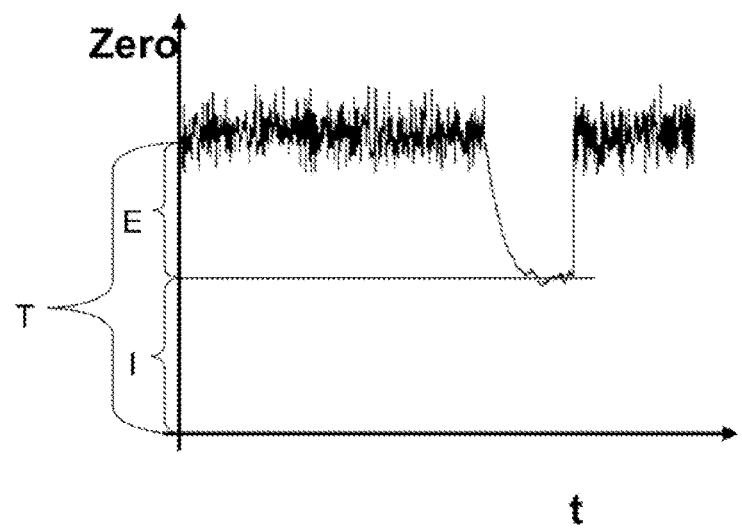
FIG. 2a shows exemplary measurement data for ascertaining the zero point error of a Coriolis mass flow meter.

The exemplary embodiment shown in FIGS. 1a to 1c of a Coriolis mass flow meter 100 comprises a base module 110 and a replaceable measuring tube assembly 140.

The base module 110 comprises a housing 120 in which a measuring tube chamber 122 for receiving a measuring tube 141 of the measuring tube assembly 140 is formed, wherein the measuring tube chamber 122 has an opening 124 through which the measuring tube 141 can be introduced into the measuring tube chamber 144. An excitation coil 112 and two sensor coils 114, 116 are arranged on a wall of the measuring tube chamber 122. The base module furthermore comprises a measuring and operating circuit 118, to which the excitation coil 112 and the sensor coils 114, 116 are connected.

The measuring tube assembly 140 comprises not only the u-shaped measuring tube 141 but also a mounting plate 148, with which the measuring tube 141 is rigidly connected and can be fixed in the housing body 120. Furthermore, the measuring tube assembly 140 comprises an excitation magnet 142 and two sensor magnets 144, 146, wherein the excitation magnet 142 is arranged at the apex of the arc of the u-shaped measuring tube 141, and the sensor magnets 144, 146 are positioned symmetrically thereto on the inlet side and on the outlet side in straight measuring-tube portions. Ideally, the excitation magnet 142 is perfectly aligned with the excitation coil 112 in the mounted state of the measuring tube assembly 140 so that by means of the exciter, which is formed by the excitation coil 112 and the excitation magnet 142, the excitation of a bending vibration takes place symmetrically to a measuring-tube transverse plane, to which the measuring tube 141 and sensors, which are formed by the sensor coils and the sensor magnets, have a mirror symmetry. Due to manufacturing tolerances, however, light symmetry deviations can occur, which cause a zero point error in the mass flow measurement.

FIG. 2a shows exemplary measurement data for ascertaining the zero point error, wherein, for this purpose, a mass flow rate measurement is performed at a mass flow rate of zero, namely once with an active exciter for maintaining a vibration in the bending vibration usage mode for ascertaining a total zero point error T, and once during the decay of the vibration with the exciter switched off, for ascertaining an exciter-independent zero point error I. The difference between the total zero point error T and the exciter-independent zero point error I is the exciter-dependent zero point error E. In parallel to the measurement of the zero point error, a damping value D for the vibration of the measuring tube in the bending vibration mode is ascertained, for example from the ratio of the excitation current and vibration amplitude.

Figure 2B:
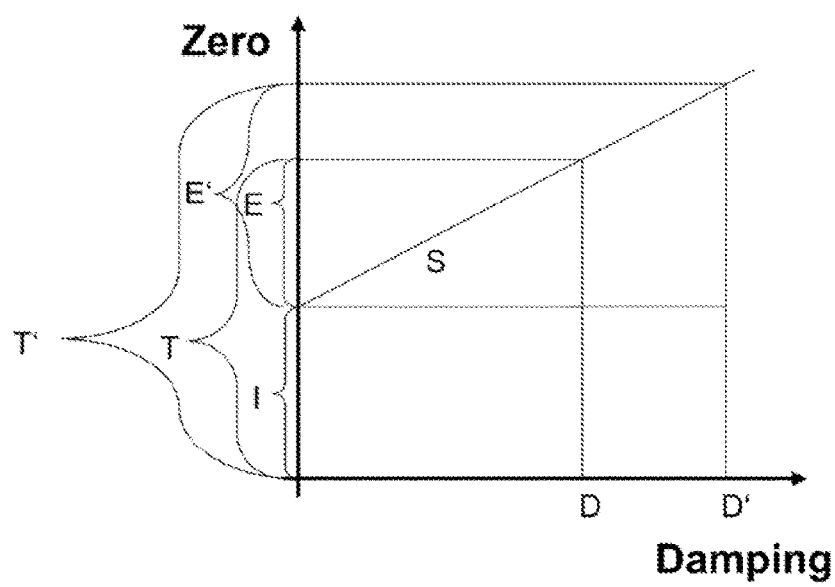
FIG. 2b shows a diagram of the contributions to the zero point error.

FIG. 2b shows how, on the basis of the above measurement results, a zero point error can be ascertained during ongoing measurement operation. It is assumed here that the exciter-dependent component E of the zero point error depends on the damping D and is especially proportional to the damping D. The proportionality constant is a sensitivity factor S that can be obtained from the above measurement by dividing the difference between the total zero point error T and the exciter-independent zero point error by the damping value, i.e.:

$$S:=E/D=(T-I)/D$$

The sensitivity factor S corresponds to the slope of the increasing straight lines in the diagram. If, for example due to changed properties of a medium flowing through the measuring tube, a new damping value D' is established, a new total zero point error is obtained as T' as follows: T':=I+E'=I+S·D'.

Figure 3A:
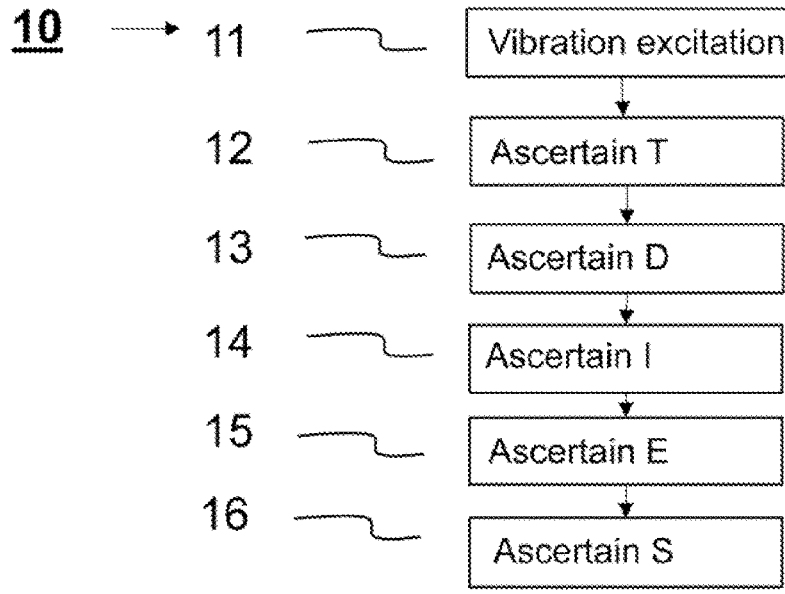
FIG. 3a shows a flow chart of an exemplary embodiment for ascertaining the variables influencing the zero point error.

The procedure is summarized in the flow chart in FIG. 3a for an exemplary embodiment 10, of the method according to the invention, which starts with the excitation 11 of a bending vibration. Ascertaining 12 the total zero point error T and ascertaining 13 the damping value D follow, which are followed by ascertaining 14 the exciter-independent zero point error I when the exciter is switched off. On the basis of the aforementioned variables, the exciter-dependent contribution E to the zero point error is ascertained 15 and the sensitivity factor S is ascertained 16.

FIG. 2b. The sensitivity factor S remains constant as long as the symmetry deviations between the exciter and the measuring tube do not change. This is usually the case for Coriolis mass flow meters with fixedly installed measuring tubes for the entire operating time. For modular devices, however, only up to the replacement of a measuring tube assembly. The respective valid sensitivity factor S can be stored in the measuring and operating circuit like the exciter-dependent zero point error I and can be used to calculate the total zero point error during ongoing measurement operation.

Figure 2C:
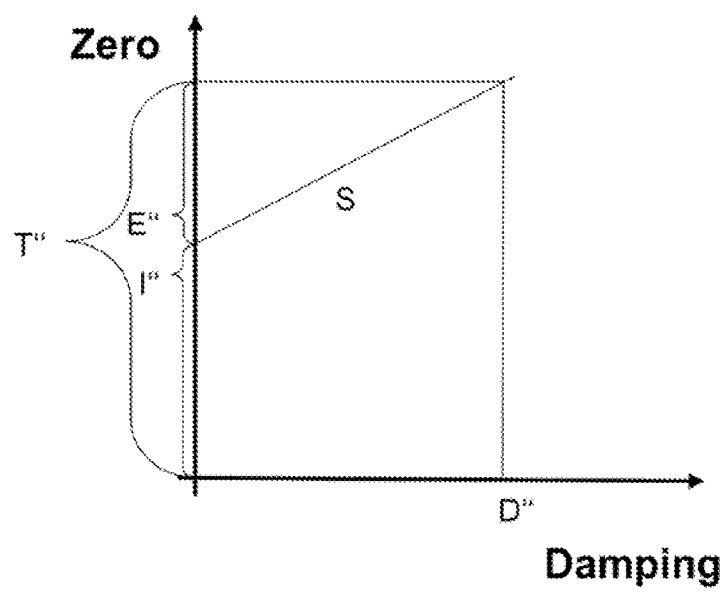
FIG. 2c shows a diagram of updating the exciter-independent zero point error.

Even though the exciter-independent zero point error I is more stable, it can also change. It is therefore recommended to occasionally update the exciter-independent zero point error I, especially when greatly changed media properties are present. The procedure is explained with reference to FIG. 2c. At a flow of zero, the total zero point error T" and a damping value D" are detected. An updated exciter-independent zero point error can thus be calculated according to:

$$I':=T'-E'=T'-S\cdot D'.$$

The updated exciter-independent zero point error I" is then stored and replaces the previously used value.

Figure 3B:
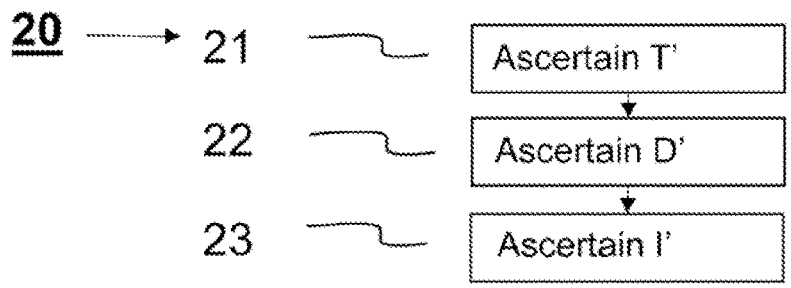
FIG. 3b shows a flow chart of an exemplary embodiment for updating the exciter-independent zero point error.

A summarized flow chart for an exemplary embodiment 20 for updating the exciter-independent zero point error is shown in FIG. 3b: After ascertaining 21 a total zero point error T' at a flow of zero and ascertaining 22 a damping value D', the exciter-independent zero point error can be ascertained 23 on the basis of T', D' and the known value S.

Figure 3C:
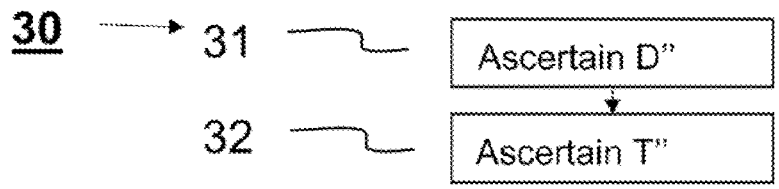
FIG. 3c shows a flow chart of an exemplary embodiment for ascertaining the total zero point error.

Assuming that the variables influencing the total zero point error T, namely the sensitivity factor S and the exciter-independent zero point error I, are known, the total zero point error can be ascertained during the ongoing measurement operation at any time on the basis of a simple damping measurement using the method according to the exemplary embodiment 30 in FIG. 3c, wherein after ascertaining 31 a current damping value D", a current total zero point error T" can be ascertained as follows: T":=I+E"=I+S·D".

The different designations of a variable X as X' and X" merely mean that the values of this variable can originate from different measurements.

Figure 3D:
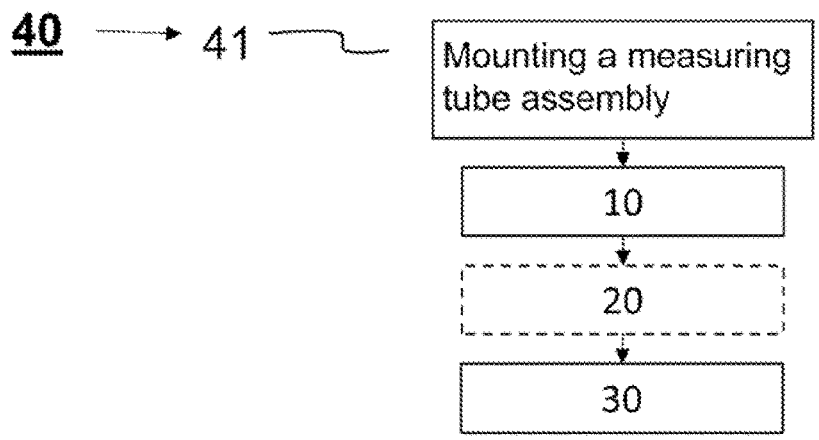
FIG. 3d shows a flow chart of an exemplary embodiment for operating a modular Coriolis mass flow meter.

FIG. 3d finally shows a method 40 for operating a modular measuring device, as is shown, for example, in FIGS. 1a to 1d. The method starts with mounting a measuring tube assembly on a base module. The variables influencing the zero point error are then ascertained using the method according to the invention according to exemplary embodiment 10 in FIG. 3a. During measurement operation, the total zero point error T is then ascertained using the method according to the invention according to exemplary embodiment 30 in FIG. 3c. If necessary, the exciter-independent zero point error I can be updated according to exemplary embodiment 20 in FIG. 3b.

The invention claimed is:

1. A method for determining variables influencing a total zero point error of a Coriolis mass flow meter comprising: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the method comprises:
    exciting a vibration of a bending vibration mode of the measuring tube;
    measuring a first total zero point error with a first medium in the measuring tube at a flow of zero;
    ascertaining a first damping value of the vibration of the bending vibration mode with the first medium in the measuring tube;
    measuring an exciter-independent zero point error during a decaying vibration of the bending vibration mode with the first medium in the measuring tube at a flow of zero;
    ascertaining a first exciter-dependent contribution to the first total zero point error based on the first total zero point error and based on the exciter-independent zero point error; and
    ascertaining a sensitivity factor for the bending vibration mode based on the first exciter-dependent contribution to the total zero point error and based on the first damping value.

2. The method of claim 1, wherein ascertaining the first damping value comprises forming a quotient of an excitation current for exciting the vibration and the vibration amplitude achieved therewith.

3. The method of claim 1, wherein ascertaining the first damping value comprises ascertaining a time constant of the decaying vibration of the bending vibration mode.

4. The method of claim 1, wherein ascertaining the first exciter-dependent contribution to the first total zero point error comprises forming a difference between the first total zero point error and the exciter-independent zero point error.

5. The method of claim 1, wherein ascertaining the sensitivity factor comprises dividing the first exciter-dependent contribution to the first total zero point error by the first damping value.

6. The method of claim 1, further comprising ascertaining an updated exciter-independent zero point error, comprising:
    exciting a vibration of a bending vibration mode with a second medium in the measuring tube;
    measuring a second total zero point error with the second medium in the measuring tube at a flow of zero;

ascertaining a second damping value with the second medium in the measuring tube;

ascertaining the updated exciter-independent zero point error on the basis of the second total zero point error, the second damping value and the sensitivity factor.

7. The method of claim 6, further comprising determining a third total zero point error of the Coriolis mass flow meter, wherein the method comprises:

ascertaining a third damping value for a vibration of the bending vibration mode with a third medium in the measuring tube; and calculating the third total zero point error on the basis of the third damping value and the sensitivity factor for the bending vibration mode and the exciter-independent zero point error.

8. The method of claim 7, wherein the third total zero point error comprises the sum of the exciter-independent zero point error and a third exciter-dependent contribution to the total zero point error.

9. The method of claim 8, wherein the third exciter-dependent contribution to the total zero point error comprises a product of the sensitivity factor and the third damping value.

10. A Coriolis mass flow meter comprising: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the measuring and operating circuit is configured to perform the method of claim 1.

11. A method for operating a modular Coriolis mass flow meter comprising: at least one measuring tube mounted so as to be able to vibrate, for conducting a medium; an exciter for exciting a bending vibration mode; at least two vibration sensors for detecting vibrations of the measuring tube; and at least one measuring and operating circuit for driving the exciter, for detecting sensor signals of the vibration sensors and for ascertaining a mass flow measurement value as a function of the sensor signals, wherein the Coriolis mass flow meter comprises a base module and a replaceable measuring tube module, wherein the measuring tube module comprises the measuring tube and a first component each of the exciter and of the two vibration sensors, wherein the base module comprises the measuring and operating circuit, a housing with a receptacle for the measuring tube module, and a second component each of the exciter and of the two vibration sensors, wherein the method comprises:

connecting the measuring tube module to the base module so that the first and second components of the exciter and of the two sensors are in each case in an operative position to one another; and ascertaining a sensitivity factor and an exciter-independent zero point error using a method according to the following method:

exciting a vibration of a bending vibration mode of the measuring tube;

measuring a first total zero point error with a first medium in the measuring tube at a flow of zero;

ascertaining a first damping value of the vibration of the bending vibration mode with the first medium in the measuring tube;

measuring an exciter-independent zero point error during a decaying vibration of the bending vibration mode with the first medium in the measuring tube at a flow of zero;

ascertaining a first exciter-dependent contribution to the first total zero point error based on the first total zero point error and based on the exciter-independent zero point error; and ascertaining a sensitivity factor for the bending vibration mode based on the first exciter-dependent contribution to the total zero point error and based on the first damping value.

12. The method of claim 11, further comprising: determining a zero point error by: ascertaining a second damping value for a vibration of the bending vibration mode with a second medium in the measuring tube; and calculating the second total zero point error on the basis of the second damping value and the sensitivity factor for the bending vibration mode and the exciter-independent zero point error.

* * * * *